United States Patent [19]
Doty et al.

[11] Patent Number: 6,030,446
[45] Date of Patent: *Feb. 29, 2000

[54] CEMENTITIOUS COMPOSITIONS AND LIGHTWEIGHT STRUCTURAL UNITS

[75] Inventors: Steven Everett Doty, Charleston; Robert Jeffry Maddy, St. Albans, both of W. Va.

[73] Assignee: Peerless Block & Brick Co., St. Albans, W. Va.

[*] Notice: This patent issued on a continued prosecution application filed under 37 CFR 1.53(d), and is subject to the twenty year patent term provisions of 35 U.S.C. 154(a)(2).

[21] Appl. No.: 08/654,576

[22] Filed: May 29, 1996

[51] Int. Cl.⁷ .................................................. C04B 16/08
[52] U.S. Cl. ..................... 106/677; 106/672; 106/679; 106/705; 106/709; 106/819; 106/DIG. 1
[58] Field of Search .............................. 428/703; 106/672, 106/677, 679, 697, 705, 706, 708, 709, 711, 717, 719, 724, 819, 823, DIG. 1

[56] References Cited

U.S. PATENT DOCUMENTS

| | | |
|---|---|---|
| 3,961,973 | 6/1976 | Jones . |
| 4,040,852 | 8/1977 | Jones . |
| 4,058,406 | 11/1977 | Raponi . |
| 4,210,457 | 7/1980 | Dodson et al. . |
| 4,306,395 | 12/1981 | Carpenter ............................... 52/223 R |
| 4,330,632 | 5/1982 | Haynes et al. .......................... 501/140 |
| 4,741,782 | 5/1988 | Styron . |
| 5,358,760 | 10/1994 | Furlong et al. . |
| 5,482,550 | 1/1996 | Strait ....................................... 106/677 |
| 5,580,378 | 12/1996 | Shulman ................................. 106/677 |
| 5,622,556 | 4/1997 | Shulman ................................. 106/677 |

*Primary Examiner*—Daniel Zirker
*Attorney, Agent, or Firm*—Steptoe & Johnson

[57] ABSTRACT

A cementitious composition for the molding of ultra-lightweight, durable, large structural units comprising Portland cement, coal combustion byproducts, expanded or extruded polystyrene and water, and a modified block machine used in the manufacture of such structural units.

16 Claims, 3 Drawing Sheets

CEMENTITIOUS COMPOSITIONS AND LIGHTWEIGHT STRUCTURAL UNITS

BACKGROUND OF THE INVENTION

1. Field of the Invention

The present invention relates to cementitious compositions comprising Portland cement, coal combustion byproducts, expanded or extruded polystyrene, and, optionally, fiber. The invention further embraces lightweight structural units such as concrete masonry units (hereinafter "CMUs") produced from the cementitious composition of the present invention and a block machine used for preparing CMUs from the cementitious composition. The CMUs are used in the mining and construction industries.

2. Description of the Prior Art

It is well known in the mining industry to use CMUs to seal off areas in an underground mine which are not in use, and to direct the flow of air in areas which are in use, for the purpose of controlling ventilation in the mine. It is also well known to use structural units, such as CMUs, in the construction industry for the fabrication of masonry structures and the like.

Cementitious compositions used in the past to produce CMUs include combinations of Portland cement; coal combustion byproducts; sand, limestone and other aggregates; and water. These CMUs typically have a density ranging from 75 to 130 pounds per cubic foot, and have dimensions of approximately 8"×8"×16".

CMUs manufactured from these compositions are traditionally manufactured using one of two processes, typically depending on the water content of the mixture: (1) the block machine process, when the water content of the mixture is low (a mixture with low water content, i.e. from 0.01 to 5 gallons of water per cubic foot of dry mixture, is typically referred to as having a "low slump"), and (2) the "wet-pour" process, when the water content of the mixture is high (a mixture with high water content, i.e. from 5 to 10 gallons of water per cubic foot of dry mixture, is typically referred to as having a "high slump"). The manufacturing process utilizing the block machine, such as a Besser Block Machine, Model No. V312, includes feeding the cementitious composition into a mold, applying pressure and vibration while the composition is in the mold, extracting the resulting product from the mold and kilning and/or drying the product. Certain traditional CMUs must be manufactured using the "wet-pour" process due to the high slump of the cementitious composition used in the manufacture of such CMUs. The "wet-pour" process includes pouring the cementitious composition into a mold and, while still in the mold, kilning and/or drying the product. This latter process is more time consuming than the block machine process and requires the use of a number of molds during the manufacturing process. While a block machine requires an extensive start-up cost, ultimately the block machine process is less expensive and more efficient than the "wet-pour" process.

The CMUs produced from the traditional cementitious compositions described above are heavier than preferred for use in the mining industry. Preferably, the CMUs used in the mining industry are ultra-lightweight, i.e., having a density of from 25 to 45 pounds per cubic foot, and dimensions ranging in size from 6"×16"×24" to 8"×16"×24". A cementitious composition used in the past to produce such ultra-lightweight CMUs comprises Portland cement, coal combustion byproducts, soap bubbles and water. Due to the introduction of soap bubbles into the composition, the composition necessarily has a high water content, and therefore a high slump, to incorporate and maintain the soap bubbles. As a result, these ultra-lightweight CMUs must be manufactured using the "wet-pour" process described above, and therefore the resulting CMUs must dry for an extended period of time while still in the molds, which is more expensive and more time consuming than is the use of the block machine.

The ultra-lightweight CMUs produced from a cementitious composition comprising soap bubbles also tend, when subjected to certain environmental conditions (such as low humidity, vibration, foam density, and high heat), to lose their shape and to vary in size and density. Furthermore, the prior art ultra-lightweight CMUs tend to break and crack during their manufacture, shipment and/or installation.

Accordingly, there is a need in the art for a cementitious composition which can be used in a block machine for the manufacture of large and ultra-lightweight CMUs, which will maintain their shape (and thus size and density) and which are easily toolable with standard masonry tools, and which will not break or crack during their manufacture, shipment and/or installation.

SUMMARY OF THE INVENTION

Our invention is directed to cementations compositions comprising Portland cement, extruded or expanded polystyrene, coal combustion byproducts, water, and, optionally, fiber. Each element of the cementitious composition is present in an amount sufficient to form a low slump mixture.

The inclusion of expanded or extruded polystyrene in the cementitious compositions of the present invention allows for the manufacture of CMUs that are ultra-lightweight, have even consistency, maintain their shape (and thus size and density) and do not break or crack during their manufacture, shipment and/or installation. The inclusion of expanded or extruded polystyrene in the cementitious compositions of the present invention also allows for the preparation of CMUs without the use of a mold during the drying or curing process. Accordingly, instead of the "wet pour" process which must be used in the manufacture of ultra-lightweight CMUs from the prior art cementitious compositions, the present invention allows for the use of a block machine in the manufacture of CMUs from the cementitious composition of the present invention.

Additionally, we have found that if the traditionally used block machine is modified in the following manner, CMUs having a consistent shape, size and density can be manufactured. The traditional block machine may be temporarily modified by: (1) providing a raking device on the strike off bar, wherein the raking device has teeth with dimensions no greater than ½"×½" and which are spaced no more than ½" apart (so that said raking device does not pull a substantial amount of the cementitious composition mixture to the back of the mold when leveling the composition); (2) angling the front and back liners of the bed joint mold box inward 1°–5° from perpendicular (so that when the resulting product is removed from the mold, and naturally decompresses, the resulting CMU does not have a trapezoidal cross section (the pallet at the bottom of the CMU will hold the bottom of the CMU in a consistent shape until after the decompression of the polystyrene has dissipated)); and (3) providing a ramp on the feed box rail of the feed box drawer which, at its greatest height, is from ⅛" to ½" above said rail (in order to compensate for that portion of the mixture which is pulled to the back of the mold when the raked strike off bar passes over the mixture). While the head joint sides of the mold liners may also be angled in to create a true rectangular shape, this is typically not necessary (except for aesthetic purposes), as these edges are not critical to the stacking of structural units in mines or masonry structures.

DESCRIPTION OF PREFERRED EMBODIMENTS

Figure 1:
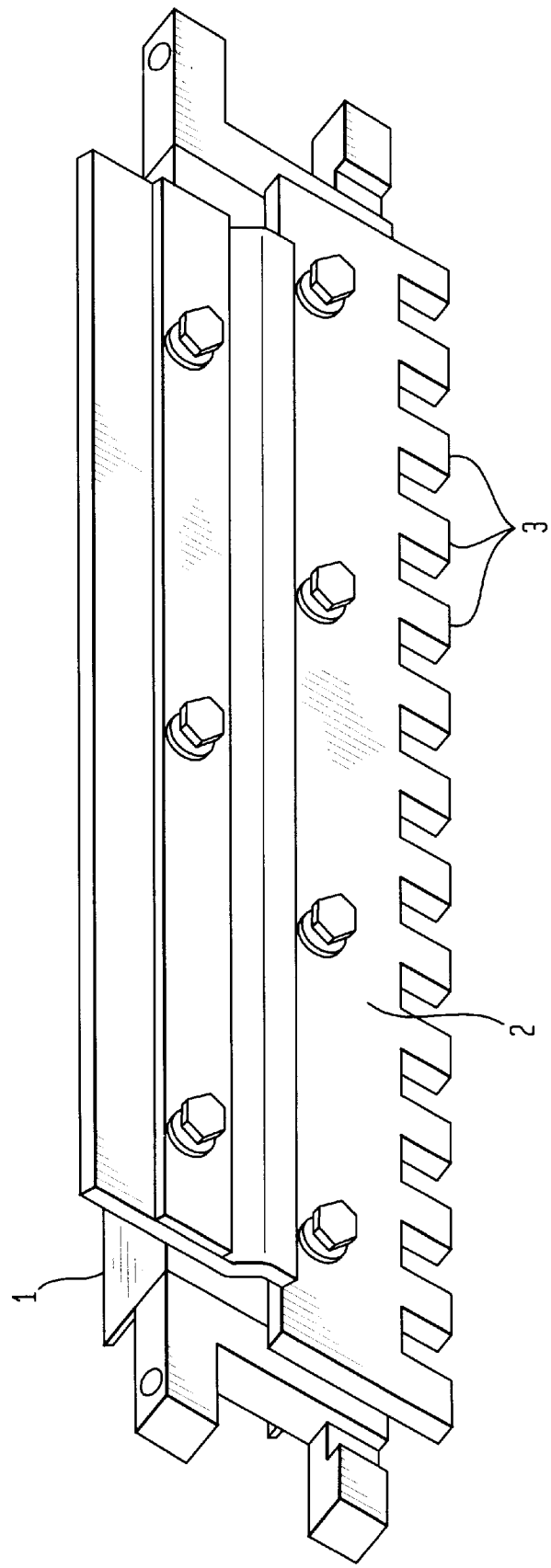
FIG. 1 is front view of the modified strike-off bar to be used in the block machine of the present invention.

The present invention encompasses cementitious compositions comprising Portland cement, expanded or extruded polystyrene, coal combustion byproducts, water and, optionally, fiber, each element being present in an amount sufficient to form a low slump mixture.

The most preferred Portland cement for use in the present invention is Type I Portland cement, due to its low cost. The cement is preferably present in the cementitious composition in an amount equal to about 50% to 70% of the total weight of the cement, coal combustion byproducts and polystyrene mixture (hereinafter "% of the total weight of the unsaturated mixture"). Most preferably, the Portland cement is present in an amount equal to about 60% to 65% of the total weight of the unsaturated mixture.

Suitable expanded polystyrene for use in the present invention is virgin expanded polystyrene, or ground or shredded expanded or extruded polystyrene, having an average diameter less than or equal to ⅜. Most preferable is the use of ground or shredded polystyrene because it provides a rougher surface which contributes to adherence and cohesiveness of the cementitious composition. The polystyrene regrind can be wholly comprised of polystyrene waste (e.g., waste from manufacturers of polystyrene products and/or from consumer polystyrene waste). Currently, such polystyrene waste is transported to landfills for disposal, and as a result solid waste authorities are a lucrative source for such polystyrene. Since the polystyrene shall be bound into the CMUs manufactured under the process set forth herein, post-consumer waste is a viable source for such polystyrene. Additionally, the use of waste polystyrene curtails the economic loss and environmental problems associated with the disposal thereof The expanded or extruded polystyrene waste may be ground or shredded, for example, by a commercial regranulator, such as TSI Model 800. The amount of expanded or extruded polystyrene present in the compositions of the present invention is preferably about 3% to 10% of the total weight of the unsaturated mixture, and is most preferably about 4% to 5% of the total weight of the unsaturated mixture.

Suitable coal combustion byproducts for use in the cementitious compositions of the present invention include, for example, pozzolanic byproducts such as fly ash, stack dust, and fly ash with or without pyrates, and aggregate functioning byproducts such as bottom ash, [stack dust,] cinders, and bottom ash with or without pyrates. The most preferred coal combustion byproduct is the aggregate ultralight bottom ash, having a density of less than forty pounds per cubic foot. Preferably, the amount of coal combustion byproduct present is about 25% to 50% of the total weight of the unsaturated mixture, and is most preferably about 34.5% to 36.5% of the total weight of the unsaturated mixture. However, the consistency of the coal combustion byproducts vary depending on the conditions in which they are created. Accordingly, the amount of each ingredient of the composition of the present invention may need to be optimized depending upon the particular byproduct used.

Preferably, about 0.01 to 5 gallons of water per cubic foot of the unsaturated Portland cement, expanded or extruded polystyrene, coal combustion byproducts, and, optionally, fiber mixture are present in the compositions of the present invention. Most preferably, about 0.09 to 0.125 gallons of water per cubic foot of said unsaturated mixture are present.

Optionally, fibers may also be included in the cementitious composition of the present invention in order to increase the durability of the CMUs produced from such compositions. Suitable fiber includes, for example, plastic fibrillated or nonfibrillated fiber, such as polypropyl-nylon, PET (polyethylene terephthalate), virgin polypropylene and other similar fibers (such as are commonly used in cementitious compositions). Most preferably, the fiber is virgin polypropylene or PET. Preferably, the fiber is present in an amount of about 0.1% to 5% by weight of total unsaturated mixture, and most preferably is present in an amount of about 0.1% to 2% weight of total unsaturated mixture.

The process utilized in preparing the cementitious composition may comprise mixing Portland cement, expanded or extruded polystyrene, coal combustion byproducts, water and, optionally, fiber at one time. Most preferably, however, the process includes the following steps:

(1) First, mixing for approximately 30 seconds predetermined quantities of polystyrene and fiber, if desired, and approximately one-half of the predetermined amount of water, at a rate of 5–10 gallons per minute, so that the polystyrene and fiber (if present) are "pre-wetted".

(2) Next, the predetermined quantities of Portland cement, coal combustion byproducts and the remaining water are added to the "pre-wetted" polystyrene (and fiber, if present) and the combination is thoroughly mixed as quickly as possible (approximately 30 seconds) in order to prevent cement and aggregate agglomeration. The cementitious composition is now ready for production of the end-use product, such as a CMU.

The process utilized for preparing the CMUs of the present invention comprises:

(1) placing the cementitious composition prepared by the processes outlined above in a mold;

(2) subjecting the composition to pressure and vibration similar to that produced by a Besser Block machine; and (3) removing the resulting product from the mold and curing the product either in standard room temperature and humidity conditions or, to accelerate the curing step, in an environment of up to 100% humidity and 190° Celsius.

The CMUs of the present invention may be manufactured using the block machine process described above. We have found that modifying a block machine, such as a Besser Block Machine, Model No. V312, in the following manner results in the manufacture of CMUs that consistently have advantageous physical characteristics.

First, as represented in FIG. 1, it is preferable to provide the strike-off bar (1) with a raking device (2) wherein the notched teeth (3) of the raking device have dimensions no less than ½"×½, and are separated by a space of no less than ½".

Figure 2:
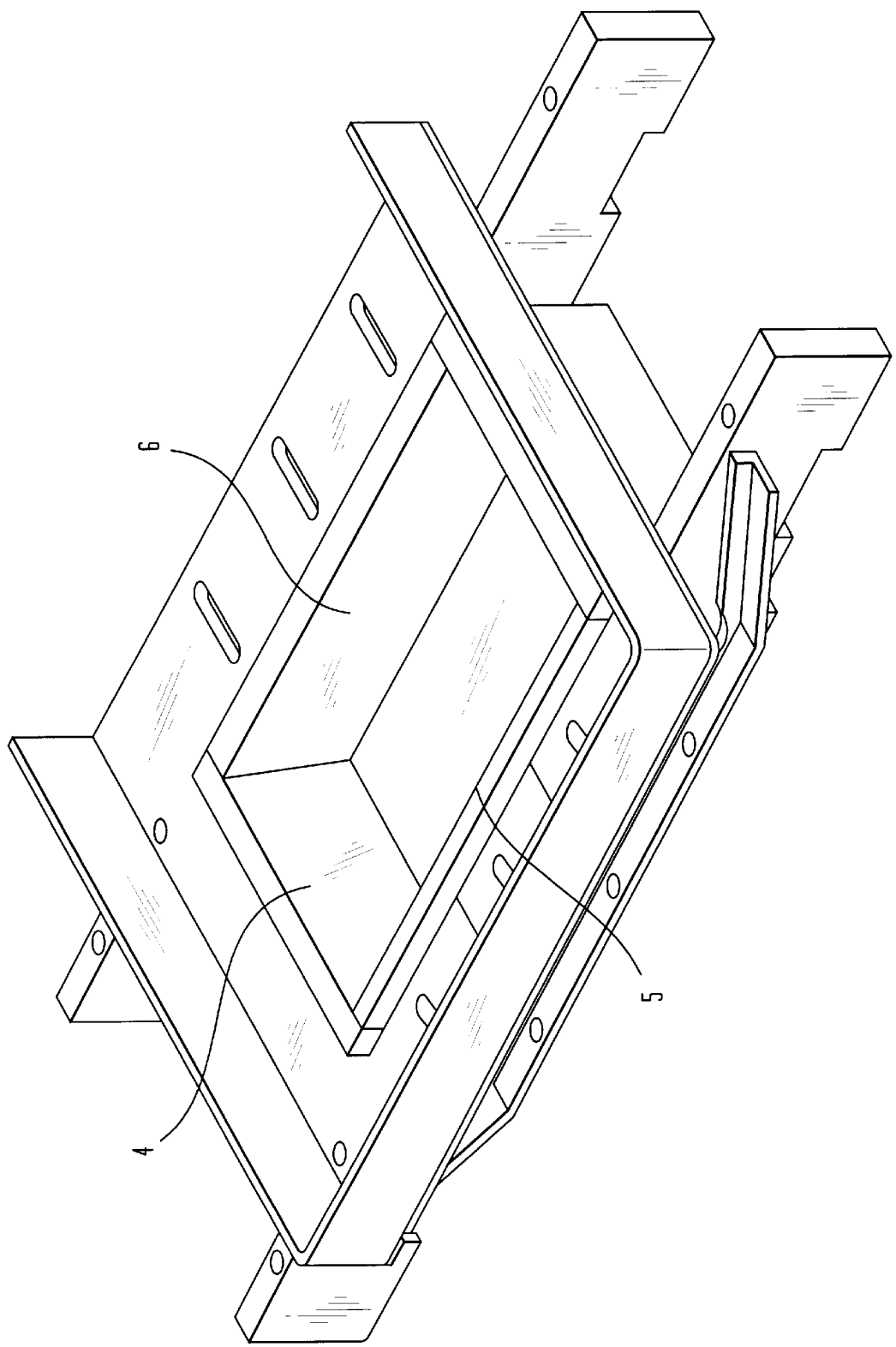
FIG. 2 is a side view of the modified feed box to be used in the block machine of the present invention.

Second, as represented in FIG. 2, the front liner (5) and back liner (6) of the bed joint mold box (4) should be angled inward from 1° to 5° from perpendicular so that when the resulting product is removed from the mold, and naturally decompresses, the resulting product does not have a trapezoidal cross-section.

Figure 3:
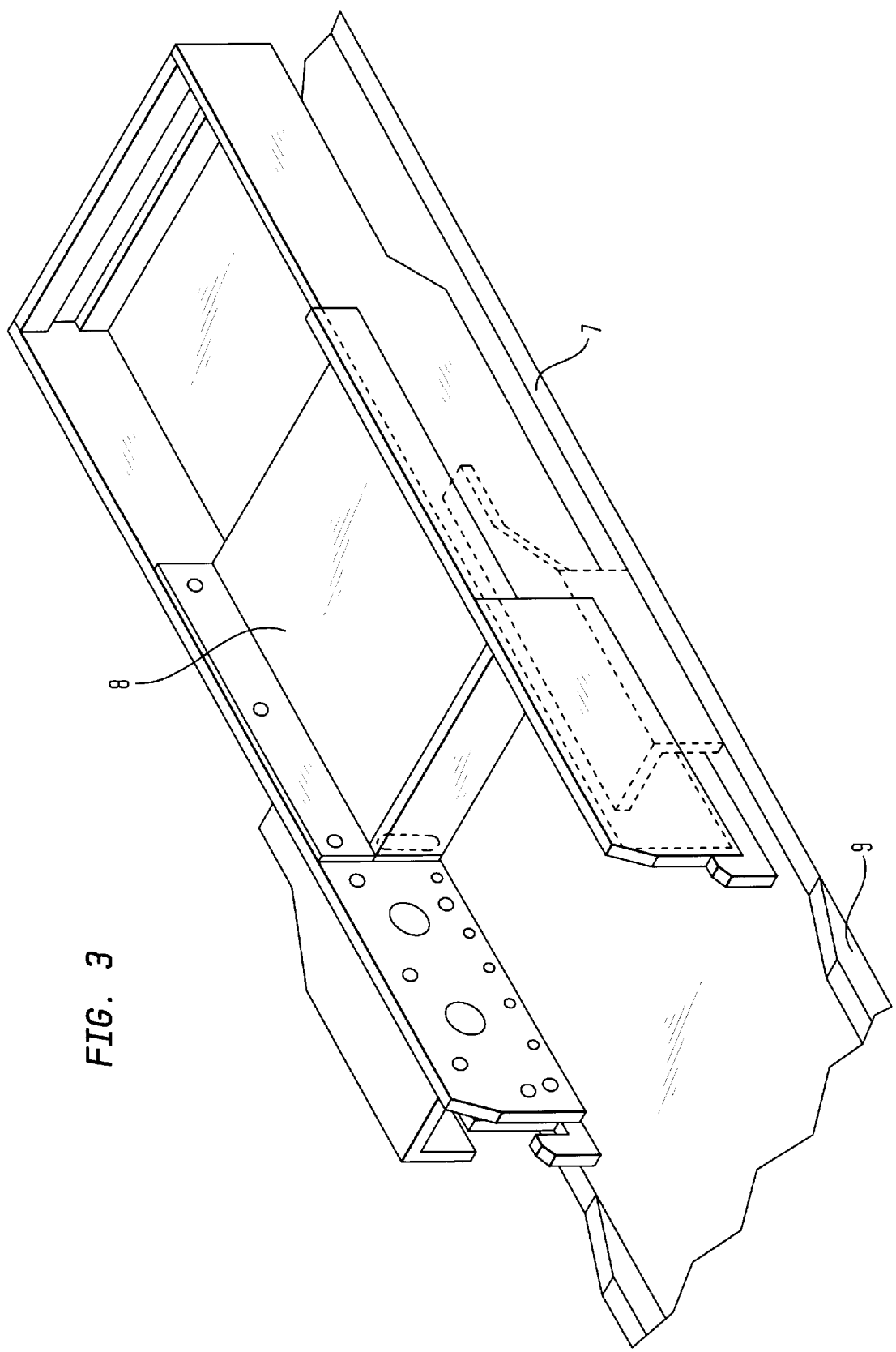
FIG. 3 is a top of the modified mold box to be used in the block machine of the present invention.

Third, as represented in FIG. 3, the feed box rail (7) on the feed box drawer (8) should be modified to include a ramp (9) which, at its greatest height, is from ⅛" to ½" above said rail, allowing additional mixture to be filled at the front of the mold.

Each of these modifications, while they may be permanent to the actual elements of the machine, are temporary modifications to the entire machine and can be replaced with parts which do not have such modifications for the manufacture of traditional structural units.

We claim:

1. A cementitious composition, comprising:
   (a) Portland cement,
   (b) one or more coal combustion byproducts which function as an aggregate,
   (c) expanded or extruded polystyrene having an average diameter no greater than about ⅜ of an inch and equaling no more than about 10% of the total weight, and
   (d) water,
   wherein the composition possesses sufficient density and rheology so as to be manufactured into concrete masonry units using a block machine.

2. The composition of claim 1 wherein the Portland cement, coal combustion byproducts, polystyrene and water are present in the following amounts:
   a. by percent of total unsaturated weight;
      i. 50%–70% Portland cement,
      ii. 25%–50% coal combustion byproducts, and
      iii. 3%–10% expanded or extruded polystyrene; and
   b. 0.01–0.5 gallons of water per cubic foot of unsaturated mixture.

3. The composition of claim 1, wherein the Portland cement, coal combustion byproducts, polystyrene and water are present in the following amounts:
   a. by percent of total unsaturated weight;
      i. 60%–65% Portland cement,
      ii. 34.5%–36.5% coal combustion byproducts, and
      iii. 4%–5% expanded or extruded polystyrene; and
   b. 0.09–0.125 gallons of water per cubic foot of unsaturated mixture.

4. The composition of claims 1, 2 or 3, further comprising, by total weight of unsaturated mixture, 0.1%–5% fiber.

5. The composition of claims 1, 2 or 3, further comprising, by total weight of unsaturated mixture, 0.1%–2% fiber.

6. A composition according to claim 1, wherein the coal combustion byproduct are comprised of bottom ash, cinders or bottom ash with or without pyrates.

7. A composition according to claim 1, wherein the coal combustion byproducts are comprised of bottom ash.

8. A composition according to claim 1, wherein the coal combustion byproducts consist essentially of bottom ash.

9. An ultra-lightweight concrete masonry unit manufactured using a block machine wherein the concrete masonry unit is formed from a cementitious composition comprising:
   (a) Portland cement,
   (b) one or more coal combustion byproducts which function as an aggregate,
   (c) expanded or extruded polystyrene having an average diameter no greater than ⅜ of an inch and equaling no more than about 10% of the total weight, and
   (d) water,
   wherein the cementitious composition is formed into the ultra-light weight concrete masonry unit by the block machine and cured.

10. The concrete masonry unit of claim 9, wherein the Portland cement, coal combustion byproducts, polystyrene and water are present in the following amounts:
    a. by percent of total unsaturated weight;
       i. 50%–70% Portland cement,
       ii. 25%–50% coal combustion byproducts, and
       iii. 3%–10% expanded or extruded polystyrene; and
    b. 0.01–0.5 gallons of water per cubic foot of unsaturated mixture.

11. The concrete masonry unit of claim 9, wherein the Portland cement, coal combustion byproducts, polystyrene and water are present in the following amounts:
    a. by percent of total unsaturated weight;
       i. 60%–65% Portland cement,
       ii. 34.5%–36.5% coal combustion byproducts, and
       iii. 4%–5% expanded or extruded polystyrene; and
    b. 0.09–0.125 gallons of water per cubic foot of unsaturated mixture.

12. The concrete masonry unit of claims 9, 10 or 11, further comprising, by total weight of unsaturated mixture, 0.1%–5% fiber.

13. The concrete masonry unit of claims 9, 10 or 11, further comprising, by total weight of unsaturated mixture, 0.1%–2% fiber.

14. A concrete masonry unit according to claim 9, wherein the coal combustion byproducts are comprised of bottom ash, cinders or bottom ash with or without pyrates.

15. A concrete masonry unit according to claim 9, wherein the coal combustion byproducts are comprised of bottom ash.

16. A concrete masonry unit according to claim 9, wherein the coal combustion byproducts consist essentially of bottom ash.

* * * * *